United States Patent
Khan

(10) Patent No.: US 9,851,616 B2
(45) Date of Patent: Dec. 26, 2017

(54) NON-MOVING OPTICAL BEAM STEERING USING NON-PIXELATED LIQUID CRYSTAL OPTICAL PHASED ARRAYS

(71) Applicant: TEXAS INSTRUMENTS INCORPORATED, Dallas, TX (US)

(72) Inventor: Sajjad A. Khan, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 596 days.

(21) Appl. No.: 14/314,060

(22) Filed: Jun. 25, 2014

(65) Prior Publication Data

US 2015/0002804 A1 Jan. 1, 2015

Related U.S. Application Data

(60) Provisional application No. 61/839,640, filed on Jun. 26, 2013.

(51) Int. Cl.
G02F 1/13 (2006.01)
G02F 1/29 (2006.01)
G02F 1/1335 (2006.01)
G02F 1/1343 (2006.01)

(52) U.S. Cl.
CPC ........ G02F 1/292 (2013.01); G02F 1/133553 (2013.01); G02F 1/134309 (2013.01); G02F 1/29 (2013.01); G02F 2001/291 (2013.01)

(58) Field of Classification Search
CPC ........................................................ G02F 1/292
USPC ........................................................... 349/202
See application file for complete search history.

(56) References Cited

U.S. PATENT DOCUMENTS

| 7,146,070 B1 | 12/2006 | Li et al. |
| 7,324,286 B1 | 1/2008 | Glebov et al. |
| 2007/0069999 A1* | 3/2007 | Gu .......................... G02F 1/292 345/84 |
| 2011/0109823 A1 | 5/2011 | Galstian et al. |

OTHER PUBLICATIONS

Lin Sun et al.;"Polymeric waveguide prism-based electro-optic beam deflector" Opt. Eng. 40(7) 1217-1222 (Jul. 2001) © 2001 Society of Photo-Optical Instrumentation Engineers.

* cited by examiner

*Primary Examiner* — Thanh-Nhan P Nguyen
(74) *Attorney, Agent, or Firm* — Michael A. Davis, Jr.; Charles A. Brill; Frank D. Cimino

(57) ABSTRACT

A method for directing light beams includes generating a light beam along a light path. A voltage differential is created by generating a voltage in a first and second linear electrode contacts arranged such that the first and second linear electrical contacts alternate with each other. The light path is altered by passing the light beam through a liquid crystal device coupled to the first and second linear electrical contacts.

17 Claims, 7 Drawing Sheets

NON-MOVING OPTICAL BEAM STEERING USING NON-PIXELATED LIQUID CRYSTAL OPTICAL PHASED ARRAYS

This application claims the benefit of Provisional Application No. 61/839,640, filed Jun. 26, 2013, the entirety of which is hereby incorporated by reference.

This relates generally to optical devices and more particularly to non-moving optical beam steering using non-pixelated liquid crystal phased arrays.

BACKGROUND

Many applications require the use of light steering mechanisms. Generally the light source that is being steered is a laser beam. Such applications include holographic data storage, line-scanned laser displays and bar-code scanners. Conventional methods of beam steering include galvanometric mirror scanners, rotating polygons, and phased array liquid crystal devices. Galvanometric scanners and rotating polygons are based on moving elements, and suffer from long-term reliability issues due to wear and tear. Rotating a polygon also consumes a significant amount of power and the size and form factor of a rotating polygon may present additional disadvantages when integrated into a device.

Liquid crystal phased arrays have been used that do not contain any moving elements, but that contain a very large number of address electrodes. For example, a primary problem in using a conventional stair-step piston type nematic liquid crystal phased array for beam steering is the requirement of using a large number of electrodes. Each electrode may have a separate voltage applied to it in order to achieve the desired optical steering characteristic. Using this technique, it is common to have a "stair step" voltage from electrode to electrode. That is, the applied voltage is raised by a certain level between successive adjacent electrodes in one dimension. For example, the voltage could be 1 volt at a first electrode, 2 volts at a second electrode, 3 volts at a third electrode, and 4 volts at a fourth electrode. Then repeat to start a new stair step function, with the voltage again being 1 volt at a fifth electrode, 2 volts at a sixth electrode, 3 volts at a seventh electrode, and 4 volt at an eighth electrode. In this example, the voltage values repeat after every four electrodes. This set of four electrodes constitutes a step-wise voltage ramp which is an approximation for a linear voltage ramp.

There are multiple sets of these ramps in a phased array device. The voltage ramp corresponds to a phase ramp in the liquid crystal device across which these multiple voltages are applied. In order to achieve high throughput diffraction efficiency, the phase ramp has to have a large number of voltage steps, which means high pixel count and complicated electronic drive schemes for generating a large number of voltage levels. Also, multiple small electrodes have to be cramped in a small space for the large number of pixels or electrodes in the voltage ramp. The larger the number of voltage steps, the better the linear voltage ramp approximation. Because adjacent pixels are at different voltage levels, there needs to be electrical isolation between these pixels in order to prevent electrical short and obtain the desired voltage ramp. This electrical isolation is in general achieved with gaps between adjacent electrodes. This gap results in lesser amount of light coupling into the desired diffraction order, thereby reducing diffraction efficiency. Also, in order to achieve large steering angles, there need to be multiple sets of electrodes for the voltage ramp in a very short space. All of these requirements makes the phased array difficult to realize. The pixilation of electrodes results in a large number of electrodes to control, lower throughput and lower diffraction efficiency, smaller steering angles, large array size, and complex driving circuitry. This also makes the fabrication and testing of the phased array very difficult and cumbersome.

Thus, it would be advantageous to have a phased array approach which addresses the foregoing issues, which is non-pixelated, which provides high throughput and high diffraction efficiency, and which enables large steering angles.

SUMMARY

Methods and apparatus for directing light beams are disclosed.

In a described example method embodiment, a light beam is generated along a light path. A voltage differential is created by generating a voltage in first and second linear electrode contacts arranged such that the first and second linear electrode contacts alternate with each other. The light path is altered by passing the light beam through a liquid crystal device coupled to the first and second linear electrode contacts and having a high impedance layer between the first and second electrode contacts.

In a described example apparatus embodiment, a device includes a first liquid crystal device in a light path. The first liquid crystal device includes first and second substrates, low and high impedance layers, a liquid crystal layer, and one or more voltage generators. The second substrate is substantially parallel to the first substrate. The low impedance layer is disposed between the first and second substrates and the high impedance layer is disposed between the low impedance layer and the second substrate. The high impedance layer has sheet impedance higher than the sheet impedance of the low impedance layer. Each electrode pair comprises first and second electrodes. Each first electrode is electrically connected to each other first electrode, and each second electrode is electrically connected to each other second electrode. The liquid crystal layer is disposed between the low impedance layer and the high impedance layer. The liquid crystal layer comprises a plurality of liquid crystal molecules oriented in a substantially similar orientation direction. The one or more voltage generators are collectively configured to provide a first voltage to each of the first electrodes and a second voltage to each of the second electrodes. The first and second voltages are configured to generate a voltage gradient between each of the plurality of first-second electrode pairs.

The described examples provide methods and apparatus for steering light beams that may or may not involve the use of moving parts. This may include non-pixelated voltage ramp generation and consequently phase ramp generation. Particular embodiments may use three-terminal electrical control as compared to pixilated stair-step type liquid crystal phased arrays. Various embodiments may have less diffraction loss and/or lower power consumption.

For angular beam steering, linear phase ramps are employed that result in an effective thin prism-like phase profile across the aperture of the liquid crystal device. Because voltage vs. phase profile of a liquid crystal device may typically be non-linear over large voltage ranges, a linear phase ramp profile may be achieved by applying only voltages in narrower ranges where the liquid crystal behavior is linear. The non-linear voltage vs. phase regions can be used for other purposes such as lens-like quadratic phase profile.

Certain embodiments may have reduced form factor. Particular embodiments may use transmissive or reflective geometry. Some embodiments may include transmissive electrodes while others may have transmissive and reflective electrodes. In some embodiments the reflective electrodes may also serve as a light reflector or mirror. In other embodiments the dielectric based reflective electrode may act as an insulation between adjacent electrical contacts. Certain embodiments may include non-linear electrical contacts, such as circular or annular contacts. The radii of such circular or annular contacts may not necessarily increase in incremental order. Other embodiments may yet include concentric circular or annular electrical contacts. Various embodiments may function without sound proofing and/or may be polarization insensitive. Certain embodiments may include multiple such devices stacked with or without minor modifications to increase the functionality of the device or include certain value adding features, such as polarization insensitivity or light reflectivity. Yet other embodiments may include application of the device in examples such as switching, from one port to multiple output ports in fiber optics or Freespace optics. Applications may include beam steering in pointing, acquisition and laser based radar needs. Light sources may include laser, light emitting diode (LED), infrared, microwave and millimeter wave sources.

DETAILED DESCRIPTION OF EXAMPLE EMBODIMENTS

Figure 1:
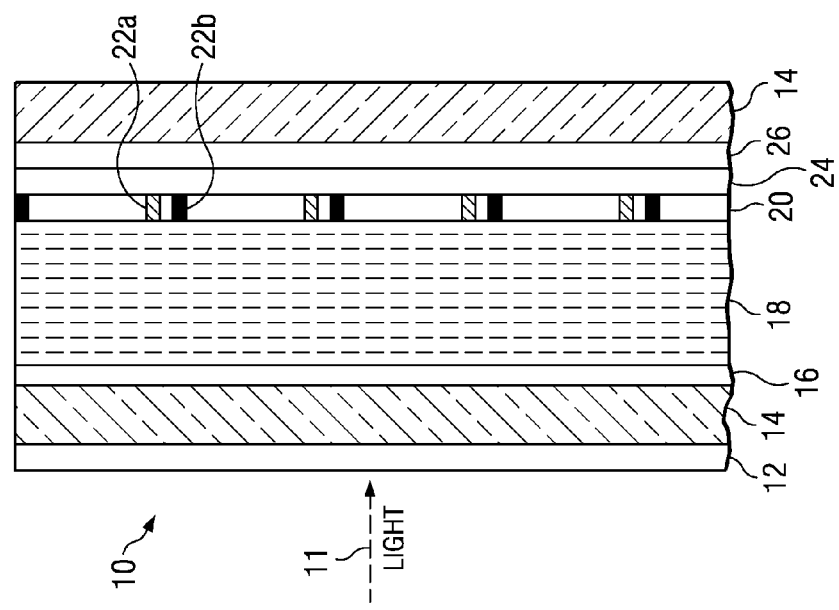
FIG. 1 is a side view of a device for non-moving optical beam steering using non-pixelated liquid crystal optical phased array in a reflective device.

A conventional stair-step piston-type nematic liquid crystal phased array for beam steering as described above requires use of a large number of electrodes. Each electrode may have a separate voltage applied to it in order to achieve the desired optical steering characteristic. Addressing each electrode and providing the proper voltage to each electrode may be complex. This disclosure provides a simpler approach to beam steering using a liquid crystal phased array.

References to the x-axis (or horizontal axis) are references to an axis having a positive direction from left to right as viewed in the drawings; references to the y-axis (or vertical axis) are references to an axis having a positive direction from bottom to top as viewed in the drawings; and references to the z-axis are references to an axis having a positive direction coming out of the page toward the viewer as viewed in the drawings.

FIG. 1 illustrates an example device 10 for non-moving optical beam steering using a non-pixelated liquid crystal optical phased array. The example illustrates an embodiment for one-dimensional beam steering in a reflective device. A beam of light 11 traveling through device 10 enters the device traveling from left to right along a horizontal path. Device 10 includes an anti-reflective coating 12, glass substrates 14, a low impedance layer 16, a liquid crystal layer 18, a high impedance layer 20, a quarter-wave plate 24, and a dielectric mirror 26.

The illustrated example device 10 uses two glass substrates 14 to sandwich low impedance layer 16, liquid crystal layer 18, high impedance layer 20, quarter-wave plate 24, and dielectric mirror 26. An anti-reflective coating 12 may be applied to a surface of the glass substrate 14 facing the incident light 11. The shown elements may be arranged so that light beam 11 passes first through anti-reflective coating 12, then through first glass substrate 14, low impedance layer 16, liquid crystal layer 18, high impedance layer 20, quarter-wave plate 24, dielectric mirror 26, and finally through second glass substrate 14. Glass substrates serve as a platform for deposition of the different layers that form the device, such as mirror, low/high impedance layers, electrode combs etc. They also contain the "liquid" and control its orientation such that it becomes crystalline.

Anti-reflective coating 12 may be applied to a single side of glass substrate 14 for purposes of minimizing reflection from an incident light beam. Anti-reflective coating 12 may be of a single layer or multi-layer coating. Anti-reflective coating 12 may be optimized for a single or multiple wavelengths of the incident light beam. Anti-reflective coating 12 may be designed for a narrowband or a broadband light source. The side of glass substrate 14 that should receive the application of anti-reflective coating 12 should be the side that a light beam first incidences device 10. Due to the construction of device 10 as described, it is likely not necessary to apply anti-reflective coating 12 to any other surface, however, if device 10 is constructed in some other fashion, such as in a transmissive geometry, it may be desired to apply anti-reflective coating 12 to other surfaces of device 10.

Glass substrates 14 may provide an enclosing material for other elements in device 10. Additional glass substrates 14 may be used in device 10 in other embodiments. Although glass is described in this particular embodiment, other materials may be used without departing from the scope and spirit of the invention.

Low impedance layer 16 may be made of a low impedance material. For example, low impedance layer 20 may have a sheet impedance of at most 10,000 Ohms per square. Although described as transparent, the term should be understood to refer to transparency to the wavelengths of light that may be used in system 10. For example, certain materials may be transparent to visible light, but opaque to infrared. Thus, the material for low impedance layer 16 may be chosen for specific wavelengths of light. A common material for low impedance layer 16 may be indium-tin-oxide (ITO). Other materials such as, carbon nanotubes or aluminum doped zinc oxide may also be used.

Liquid crystal layer 18 may be a layer of liquid crystal in a nematic state. The crystals may be substantially aligned in the absence of an electric field such that the director may be in a plane parallel to low impedance layer. The director may be aligned either parallel or perpendicular to the fingers of the electrodes, described below, in high impedance layer 20. In the illustrated embodiment the director of the liquid crystal may be along the vertical axis. Liquid crystal layer 18 may generally be a liquid crystal material with known properties with a substantially linear response to an applied electric field within a certain voltage range.

High impedance layer 20 may be a layer of high impedance material. For example, high impedance layer 20 may have a sheet impedance of at least 200 Ohm per square. In particular embodiments, high impedance layer 20 may be transparent to the wavelengths of light expected to pass through device 10. High impedance layer 20 may also contain electrodes 22a and 22b. Electrodes 22a and 22b are designed to create a voltage gradient between themselves. This may be accomplished by the use of two linear electrodes that have voltages of Va and Vb applied respectively. Electrodes 22a and 22b may be configured with respect to each other in a comb-like inter-woven pattern or two inter-woven combs. A spine could have many fingers coupled to the spine similar to a capital "E" where the vertical line forms the spine and the three horizontal lines form the fingers of electrodes 22a and 22b. Additional fingers could be added according to particular needs. A second electrode with a similar design could be placed such that the fingers of one electrode are in close proximity to the fingers a second electrode, but not touching. The second electrode may consist of a left to right mirrored letter "E". A greater amount of space could then be provided before another set of the fingers of the two electrodes are placed in proximity to each other. As illustrated in FIG. 1, a first finger from the first electrode 22a may be placed at the bottom of device 10. Electrode 22a could have voltage Va applied to it. A first finger of the second electrode 22b may be placed some distance from the finger from the first electrode. Electrode 22b could have voltage Vb applied to it. The space between finger 22a and 22b is where the eventual voltage gradient will be formed. A second finger from the first electrode 22a may be placed in close proximity to the first finger. This pattern may repeat, ending where the last finger from the second electrode 22b is placed by itself on the top of device 10. One can notice that there is space between the second finger of the first electrode 22a and the first finger of the second electrode 22b. it is desired to keep this space to a minimum for higher efficiency. It is also desired that this space be free from voltage gradient which can be done by either selectively etching out the high impedance electrode in these locations or by incorporating a material which blocks the incident light only in these selective locations for preventing unwanted diffraction. In the illustrated embodiment, the fingers of the electrodes are along the z-axis. An effect of the voltage gradient created between electrodes 22a and 22b is that the liquid crystals in liquid crystal layer 18 may act as small prisms that redirect the direction of an incoming light beam. An opaque material may be placed between the area where the two electrodes 22a and 22b are in close proximity to prevent redirection of the light in those areas.

Quarter-wave plate 24 may be used to alter the polarization of the light traveling through it. By using quarter-wave plate 24 and reflecting the incident beam through dielectric mirror 26, an unpolarized light source may be used. Dielectric mirror 26 may be used to reflect the incident light through quarter-wave plate 24, liquid crystal layer 18, and other layers in device 10. A glass substrate 14 may be placed after the dielectric mirror to sandwich device 10.

A particular problem with some liquid crystal devices is also the requirement to use polarized light. Light that is not properly polarized may not be steered in a liquid crystal device leading potentially to two light beams exiting the beam steering device. For example, unpolarized light that is traveling along the x-axis has an E-field in both the y- and z-axes. A liquid crystal device may only alter the direction of the light traveling along the y-axis as it passes through the device while not affecting the light that has an E-field along the z-axis. The presence of quarter-wave plate 24 and dielectric mirror 26 may act to alter the polarization of the light to essentially switch the E-field polarization of the y- and z-axes of the incident light beam. That is, the light that entered device 10 with an E-field polarized along the y-axis after being reflected and traveling twice through quarter-wave plate 24 is now polarized along the z-axis. The same is true for the light polarized along the z-axis. This may provide certain advantages. First, unpolarized light may be used. Second, light is steered only once. As light travels through device 10, light polarized along the y-axis is steered, while light polarized along the z-axis is not. After reflection, the light that was polarized along the y-axis is now along the z-axis and vice versa. Thus, the previously steered light is unaffected, while the light that was not steered is now steered.

In operation of device 10, a light beam enters device 10 from the side with anti-reflective coating 12. Voltages are applied to two different electrodes 22a and 22b. This creates a voltage gradient between electrodes 22a and 22b. The voltage gradient causes liquid crystal layer 18 to act as a prism. The light beam passes through glass substrate 14, low impedance layer 16, and liquid crystal layer 18 where the light beam's path is altered due to the liquid crystals acting like a prism between the two adjacent fingers of the two electrodes 22a and 22b. There are multiple such prisms due to multiple fingers of the electrodes 22a and 22b. The light beam passes through high impedance layer 20, and has its polarization altered by quarter-wave plate 24. The light beam is reflected by dielectric mirror 26. The beam of light then travels through quarter-wave plate 24 which completes a half-wave polarization of the beam of light. The slow axis of the quarter-wave plate should be oriented at 45 degrees from the director of the liquid crystal material. The light continues through device 10 traversing through high impedance layer 20, liquid crystal layer 18, low impedance layer 16, glass substrate 14 and anti-reflective layer 12. The beam of light exits device 10 at an angle from the incoming light beam's direction.

Figure 2:
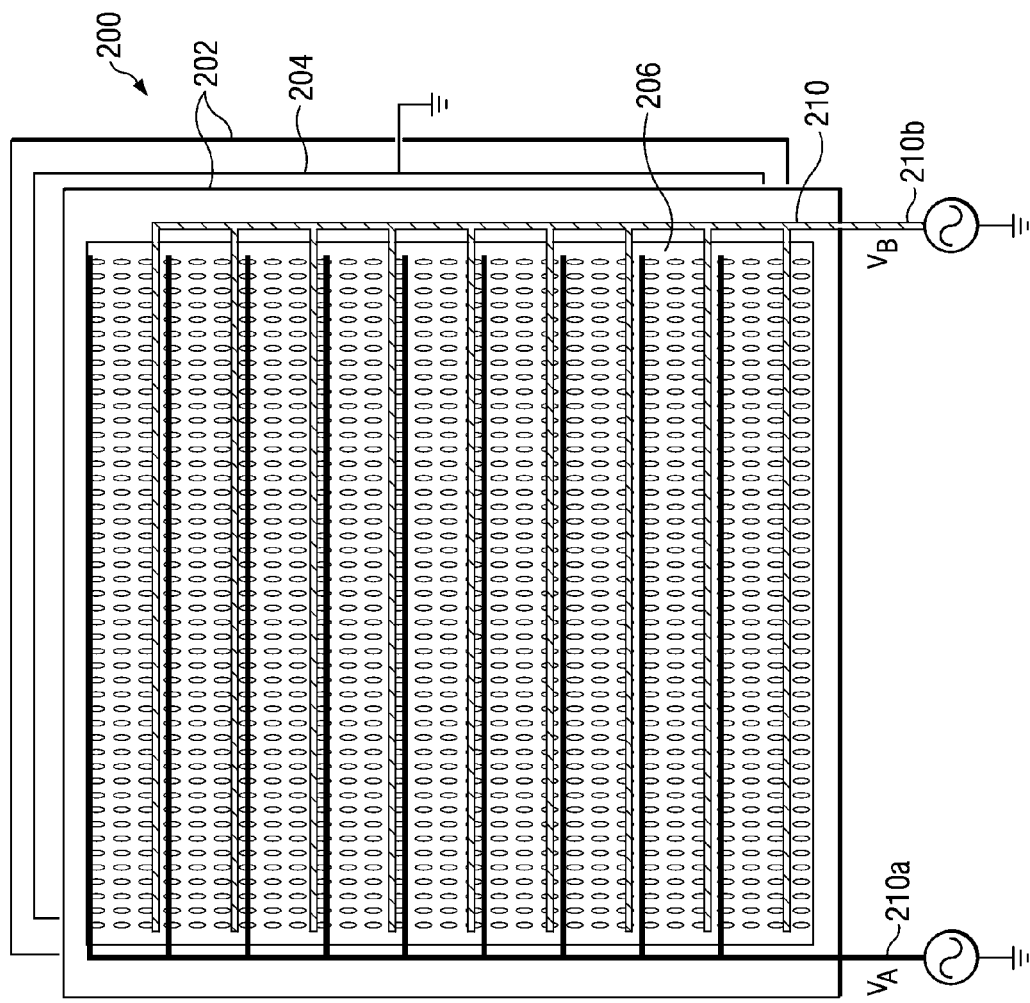
FIG. 2 illustrates a device for non-moving optical beam steering using non-pixelated liquid crystal optical phased array in a transmissive device.

FIG. 2 illustrates a device 200 for non-moving optical beam steering using non-pixelated liquid crystal optical phased array. This figure illustrates an embodiment for one-dimensional beam steering in a transmissive device. A transmissive device differs from a reflective device in that the light beam that travels through the device exits the other end as opposed to being reflected.

Device 200 includes glass substrates 202, low impedance layer 204, liquid crystal layer 206 and high impedance layer 208. A difference between device 200 and device 10 is the absence of quarter-wave plate 24 and dielectric mirror 26. Device 200 may be understood as facing the viewer. A beam of light traveling through device 200 would enter from the side facing the reader and travel through device 200 to the back of the device that is away from the viewer. It should be noted that the beam of light entering device 200 should be properly polarized.

Glass substrates 202 may perform the same function as glass substrates 14. An anti-reflective layer may be added to glass substrate 202 in order to minimize reflections of the entering light beam. Low impedance layer 204 may be similar to low impedance layer 16. Liquid crystal layer 206 as can be seen in FIG. 2 is in a plane parallel to the other layers of device 200. The director of the liquid crystal within liquid crystal layer 206 is in the plane of the layers. Although the illustrated examples use a liquid crystal material with the director substantially parallel to the plane of the layers, other approaches may also be used where the liquid crystal material director is substantially perpendicular to the plane of the layers, e.g., homeotropically aligned liquid crystal or vertically aligned liquid crystal.

High impedance layer 208 may also contain electrodes 210*a* and 210*b*. Electrodes 210*a* and 210*b* may be comb shaped. As illustrated in FIG. 2, two electrodes 210*a* and 210*b* are used in this embodiment. The first electrode 210*a* may have fingers equally spaced apart and run substantially the length of the liquid crystal layer. The spine may be substantially the height of the device and connect to a voltage source. The second electrode 210*b* may be designed similarly to the first electrode, but oriented as if the first electrode was flipped horizontally. Thus, the first and second electrodes 210*a* and 210*b* could have their fingers in an alternating pattern as illustrated in FIG. 2. Also note that the electrodes 210*b* is slightly shifted vertically such that the spacing between adjacent fingers of 210*a* and 210*b* is more on one side than the other.

An understanding of FIG. 2 may also provide greater insight into device 10 of FIG. 1. The view shown of device 200 in FIG. 2 is analogous to a front view of device 10. As described previously, the light beam travels from the front of the device as it faces the reader through the back of the device. The placement of electrodes 22*a* and 22*b* may also be clearer in FIG. 2 than in FIG. 1. It should be understood that quarter-wave plate 24 and dielectric mirror 26 are not shown in FIG. 2 due to the transmissive nature of the design in FIG. 2.

Figure 3A:
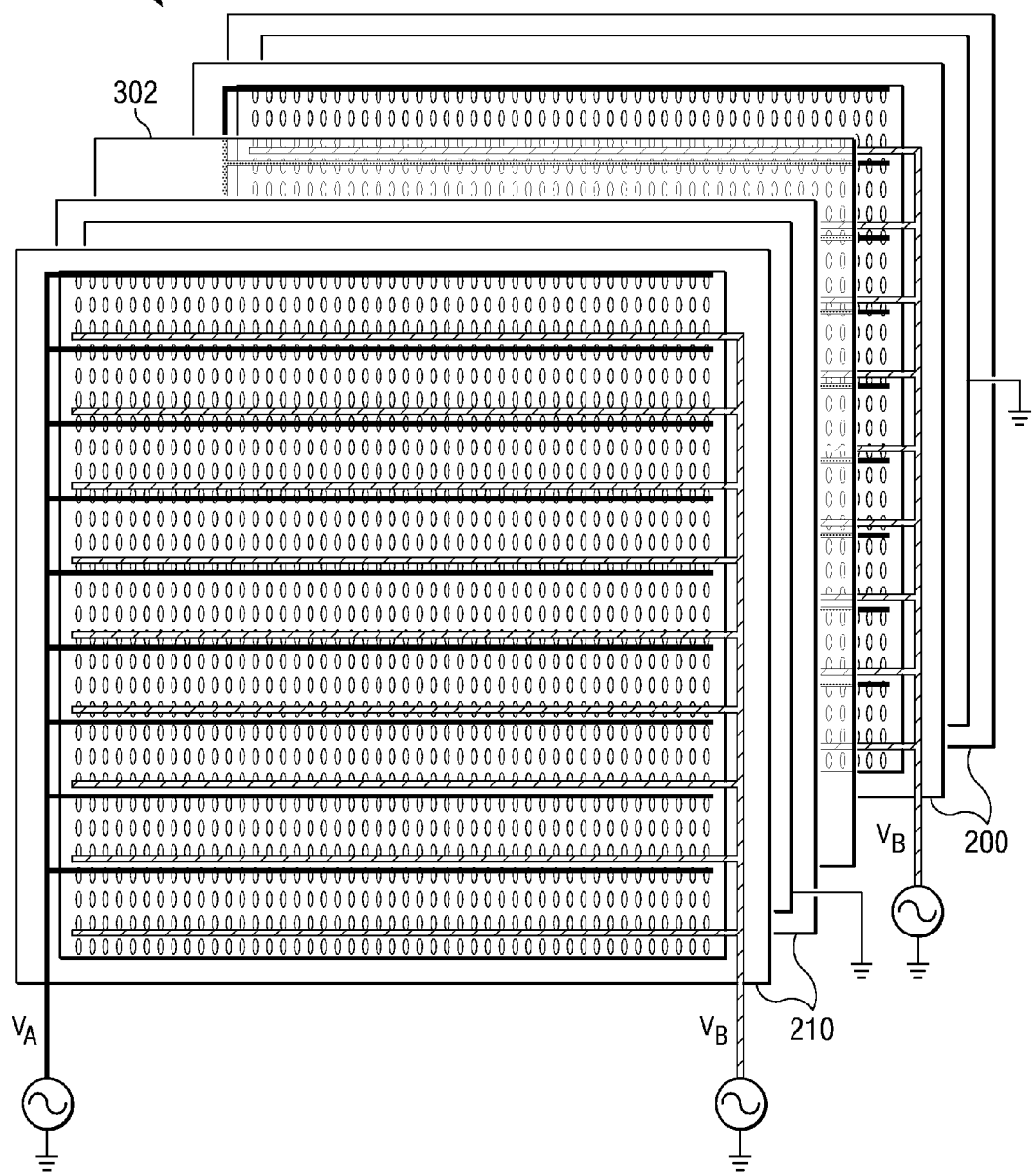
FIGS. 3A and 3B illustrate devices for non-moving optical beam steering using non-pixelated liquid crystal optical phased array in a polarization independent transmissive device.
Figure 3B:
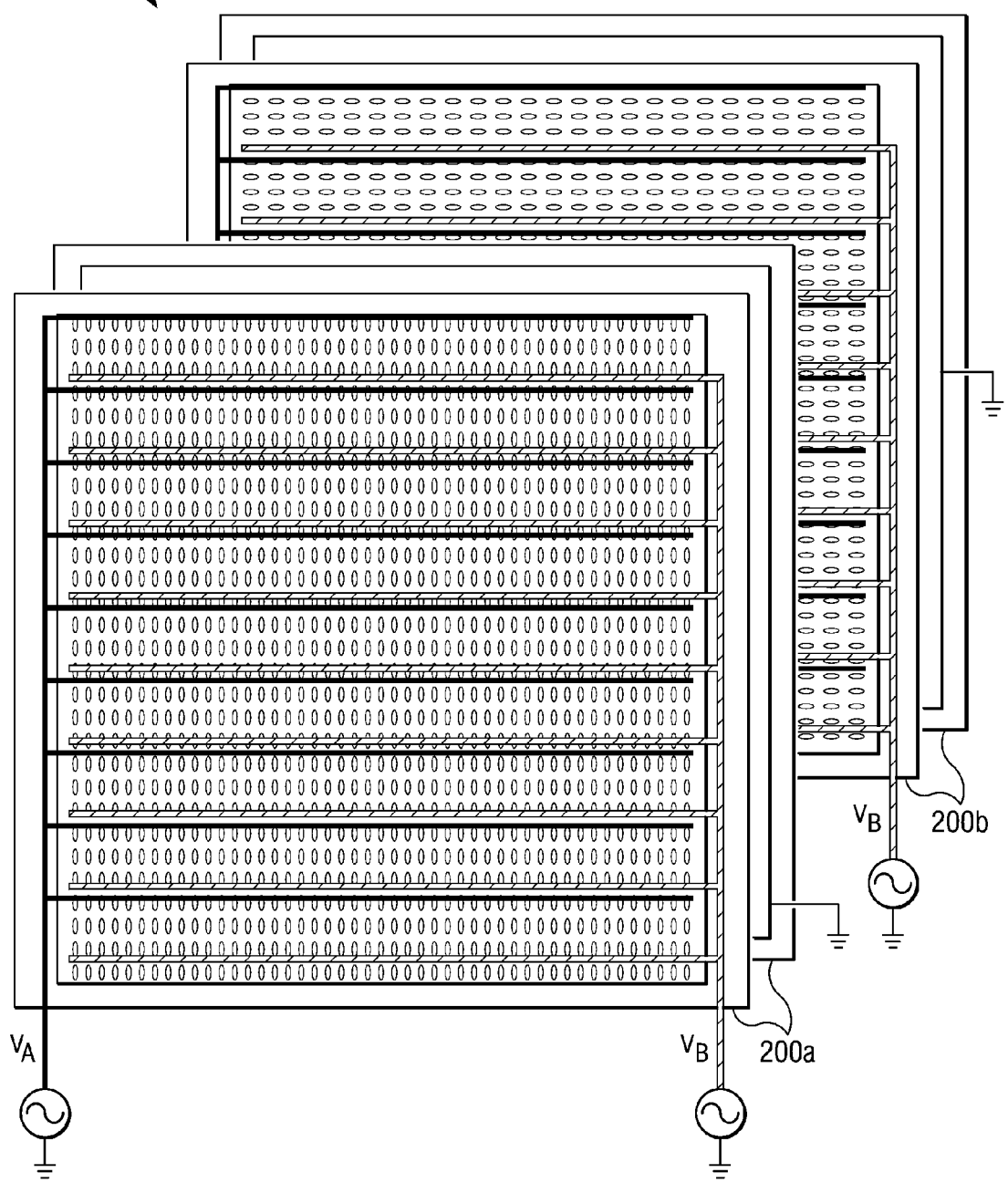

FIGS. 3A and 3B illustrate devices 300*a* and 300*b* for non-moving optical beam steering using non-pixelated liquid crystal optical phased array. Unlike reflective device 10 which is insensitive to input light polarization, transmissive device 200 requires the use of polarized light. FIGS. 3A and 3B illustrate devices for transmissive beam steering that are polarization independent.

Device 300*a* is an example embodiment where two of identical devices 200, including similar director orientation are cascaded with a half-wave plate 302 between the two devices. Half-wave plate 302 may serve the purpose of quarter-wave plate 24 in device 10. The beam of light in device 10 passes through quarter-wave plate 24 twice, resulting in an equivalent half-wave plate transformation of the light beam. Thus, in order to achieve the same effect as two passes through a quarter-wave plate, while passing through only a single device, half-wave plate 302 is utilized instead of a quarter-wave plate. Half-wave plate 302 may have its slow axis at a 45-degree angle from the director of the liquid crystals in devices 200. In other respects, the two cascaded devices 200 that comprise device 300*a* may be virtually identical. A variety of alternative configurations may be used depending, for example, on the liquid crystal materials. For example, alterative liquid crystal materials (e.g., homeotropically aligned type) may become at 45 degrees with respect to the quarter-wave plate when energized.

Device 300*b* illustrates an embodiment that is polarization independent without using a half-wave plate. Instead of using two identical devices 200 cascaded with a half-wave plate between the two devices 200, device 300*b* utilizes a different orientation of the liquid crystals in the liquid crystal layer of the second device 200. In device 300*b*, the first device 200*a* may be virtually identical to device 200 described with respect to FIG. 2. However the cascaded second device 200*b* may have its liquid crystal director orientation perpendicular to the director orientation of the first device 200. In other respects, particularly the orientation and placement of the electrodes and director of the liquid crystal, the cascaded second device 200 should remain the same.

Figure 4:
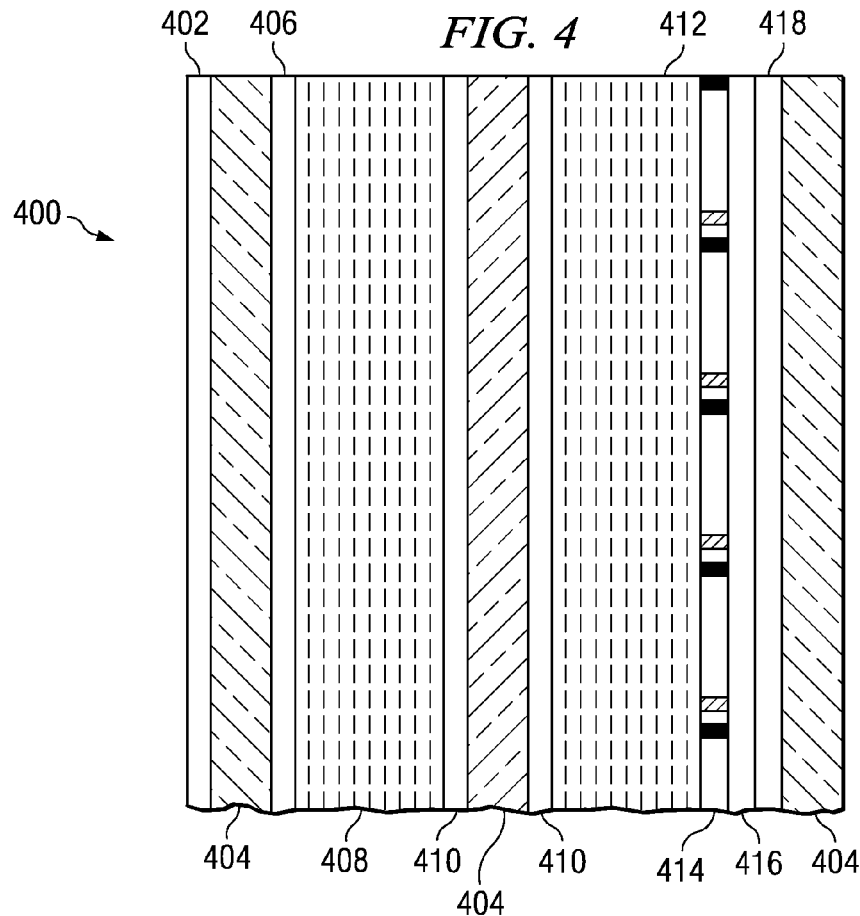
FIG. 4 illustrates a device for non-moving optical beam steering in two dimensions using non-pixelated liquid crystal optical phased array in a reflective device.

FIG. 4 is a diagram illustrating a device 400 for non-moving optical beam steering using non-pixelated liquid crystal optical phased array. This figure illustrates an embodiment for two-dimensional beam steering in a reflective device. FIG. 4 illustrates a side view of device 400. Device 400 may be formed using similar layers as device 10. Device 400 may be though of as the combination of two device 10s with certain layers removed or rotated. Device 400 may be formed with an anti-reflective layer 402. Glass substrates 404 may be provided to "sandwich" the layers of device 400. A high impedance layer 406 may be provided. In this embodiment, the comb shaped electrodes described above may be provided. In high impedance layer 406, the electrodes may be positioned such that the fingers of the electrodes are positioned vertically as viewed in FIG. 4. Thus, in FIG. 4, the electrodes do not appear to be illustrated. This arrangement may be more clearly seen in FIG. 5, described below.

A liquid crystal layer 408 may be provided. The crystals may be substantially aligned in the absence of an electric field such that the director may be in a plane parallel to the plane of the layers in this device. A low impedance layer 410 may be provided. A second glass substrate 404 may be provided. A second low impedance layer 410 may be provided. A second liquid crystal layer 412 may be provided. The crystals may be substantially aligned in the absence of an electric field such that the director may be in a plane parallel to the plane of the layers in this device. A second high impedance layer 414 may be provided. High impedance layer 414 may contain electrodes as described with device 10. As shown in FIG. 4, the electrodes may be in a horizontal arrangement in a plane normal to the page.

A quarter-wave plate 416 may be used to alter the polarization of the light traveling through it. Liquid crystals inherently contain a polarization. By using quarter-wave plate 416 and reflecting the incident beam through dielectric mirror 418, an unpolarized light source may be used as described in paragraphs above earlier. Dielectric mirror 418 may be used to reflect the incident light through quarter-wave plate 416 and the other layers of device 400. A glass substrate 404 may be placed after the dielectric mirror to sandwich device 400. Also note that a variety of alternative configurations may be used depending, for example, on the liquid crystal materials. For example, alterative liquid crystal materials (e.g., homeotropically aligned type) may become at 45 degrees with respect to the quarter-wave plate when energized.

Figure 5:
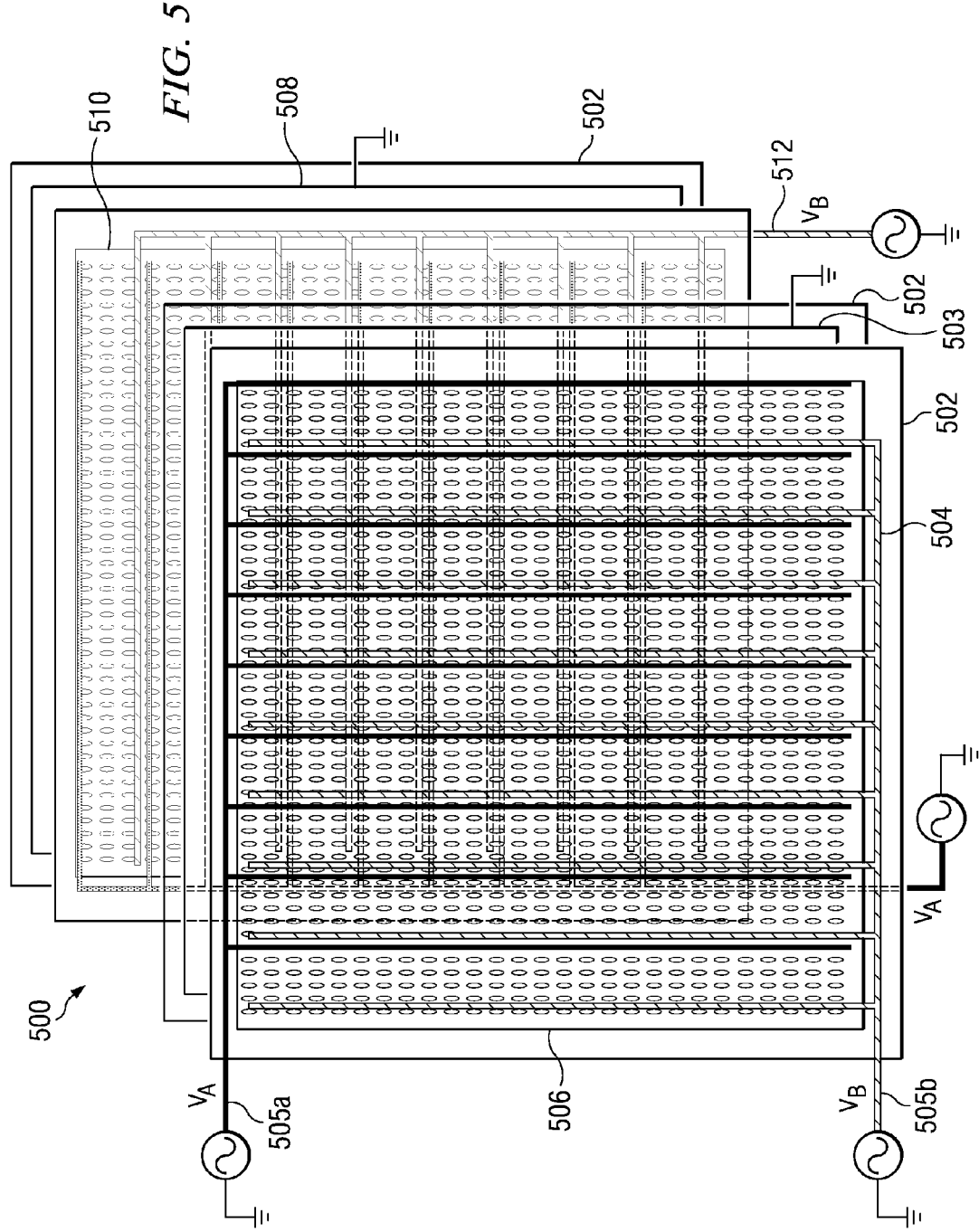
FIG. 5 illustrates a device for non-moving optical beam steering in two dimensions using non-pixelated liquid crystal optical phased array in a transmissive device.

FIG. 5 illustrates a device 500 for non-moving optical beam steering using non-pixelated liquid crystal optical phased array. This figure illustrates an embodiment for two-dimensional beam steering in a transmissive device. It should be noted that the embodiment illustrated in FIG. 5 may require the use of polarized light.

Device 500 may be understood as a front view of device 400 with quarter-wave plate 416 and dielectric mirror 418 removed. This may also help provide a greater understanding of the electrode placement in high impedance layer 406 in FIG. 4.

In device 500 glass substrates 502 may be provided to "sandwich" the layers of device 500. A low impedance layer 503 may be provided. A high impedance layer 504 may be provided [504 is not clearly marked in the figure]. In this embodiment, the comb shaped electrodes described earlier may be provided. In high impedance layer 504, the electrodes 505a and 505b may be positioned such that the fingers of the electrodes are positioned vertically as illustrated in FIG. 5. This arrangement may be considered a rotation of the electrodes of device 10 in FIG. 1 by 90 degrees.

A liquid crystal layer 506 may be provided. The crystals may be substantially aligned in the absence of an electric field such that the director may be in a plane parallel to the plane of the layers in this device. A low impedance layer 508 may be provided. A second glass substrate 502 may be provided. A second low impedance layer 508 may be provided. A second liquid crystal layer 510 may be provided. The crystals may be substantially aligned in the absence of an electric field such that the director may be in a plane parallel to the plane of the layers in this device. A second high impedance layer 512 may be provided [512 is incorrectly marked in the figure]. High impedance layer 512 may contain electrodes as described with device 10. As shown in FIG. 5, the comb electrodes may be rotated 90 degrees from the comb electrodes shown in high impedance layer 504. A glass substrate 502 may be placed after high impedance layer 512 to sandwich device 500.

Cascading device 500 with an identical device 500 with a half-wave plate between the cascaded devices 500 may provide the benefit of polarization independent beam steering in two dimensions in a transmissive device.

Figure 6A:
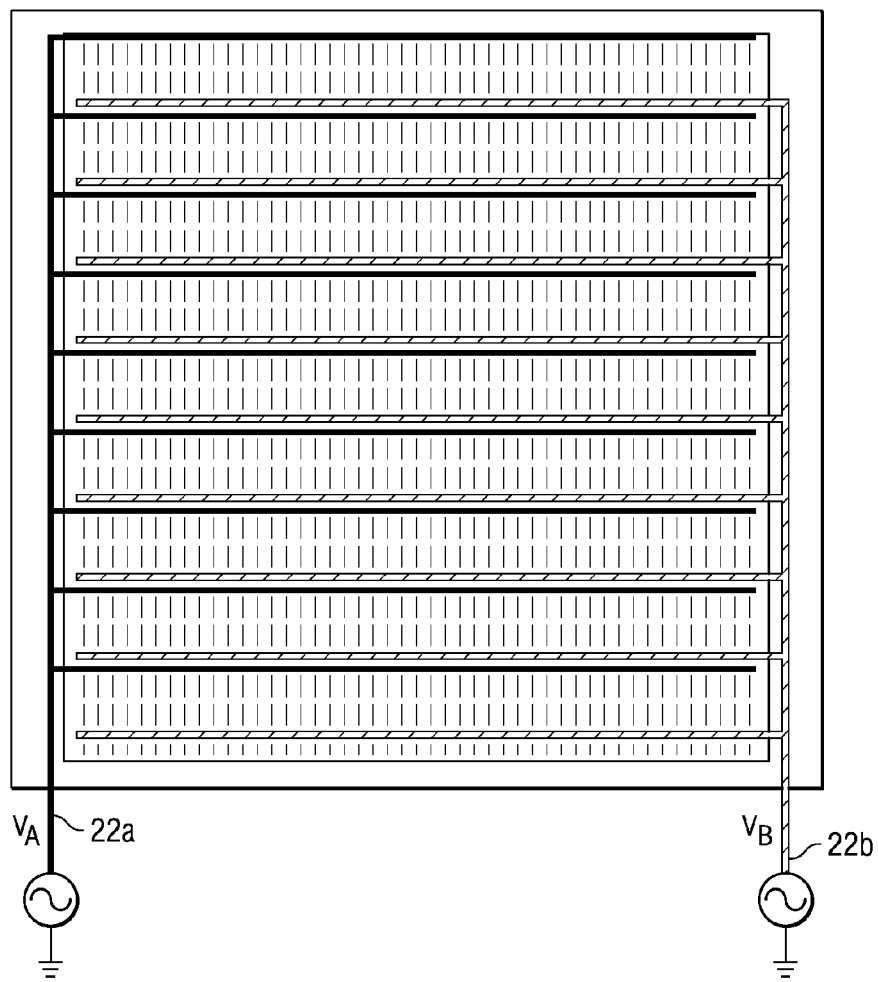
FIGS. 6A-6D illustrate embodiments of electrical contacts in a device for non-moving optical beam steering in a device using a non-pixelated liquid crystal optical phased array.
Figure 6B:
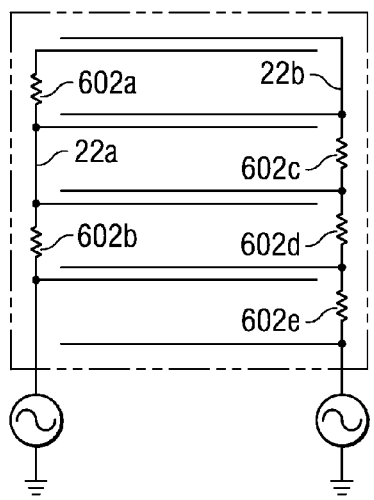
Figure 6C:
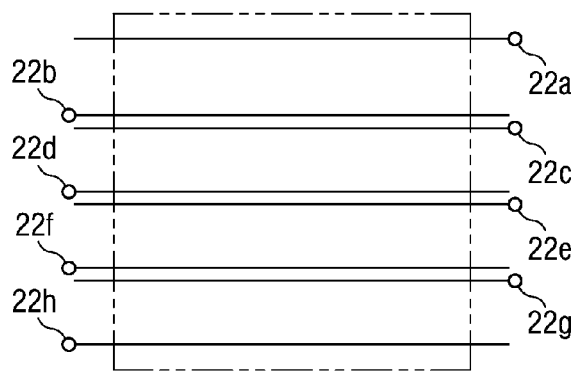
Figure 6D:
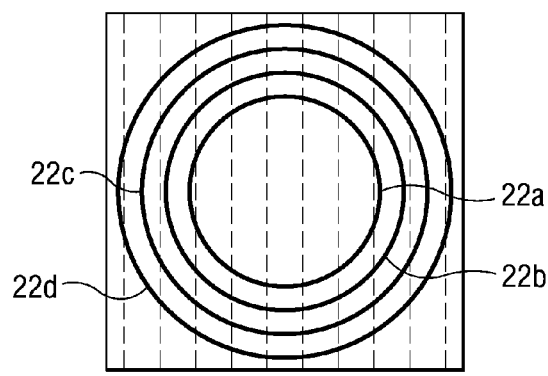

FIGS. 6A-6D illustrate embodiments of electrodes in a device for non-moving optical beam steering in a device using a non-pixelated liquid crystal optical phased array. FIG. 6A illustrates a "comb" style electrode configuration. FIG. 6B illustrates a comb style configuration with resistors. FIG. 6C illustrates a comb style configuration with each "finger" of the comb connected to separate voltage inputs. FIG. 6D illustrates a concentric electrode configuration.

In FIG. 6A, electrodes 22a and 22b are each connected to the same or different voltage sources that may generate voltages for each of electrodes 22a and 22b. In FIG. 6B, resistors 602 are coupled to electrodes 22a and 22b. Resistors 602 are connected to the "spine" of the comb. A resistor 602 may be coupled prior to a connection to a finger of the comb. This may allow each finger to have a different voltage than other fingers on the comb. Alternatively, resistors may not be coupled to the spine before every finger as illustrated on electrode 22a. The values of resistors 602 may be chosen so that desired voltage values at each of the fingers may be achieved. FIG. 6C illustrates a linear configuration of electrodes 22. In this configuration, the comb no longer has a spine connected to a voltage source, but rather each finger of the comb may be connected to separate voltages sources allowing each finger's voltage to be configured individually. FIG. 6D illustrates a concentric electrode 22 configuration. This configuration may connect each electrode 22a, 22b, and 22c to separate voltage sources. This configuration may result in a Fresnel type lens for device 10.

The different electrode arrangements may allow for other applications for this device such as in variable focus lens where either a cylindrical or spherical Fresnel lens can be formed. The spacing between successive adjacent electrode whether linear or circular or otherwise can be varied in a non-uniform fashion to achieve certain voltage gradient and hence corresponding phase gradient. Other applications include lenslet arrays with variable or adjustable focus, fiber optic alignment stage, fiberoptic switches, and reconfigurable add/drop multiplexers. As an example application, the non-pixelated liquid crystal phased array can be used to switch an input signal into any one of N output ports to provide a 1×N switch for numerous applications such as in fiber optics or Freespace optics. Similarly and N×N switch can be made with the use of N such devices to rout any one of N input ports to any one of N output ports.

According to an alternative embodiment, each electrode (e.g., electrode 22a, electrode 22b, etc.) may be formed within high impedance layer 20 such that multiple concentric circular regions are removed from the electrode. For example, concentric circular rings may be etched from the electrode, leaving voids through which light beams may pass. A controlled gradient may be achieved within these concentric-shaped electrodes at least in part by the pattern of concentric rings and the associated decreasing radii of the non-etched portions.

Figure 7:
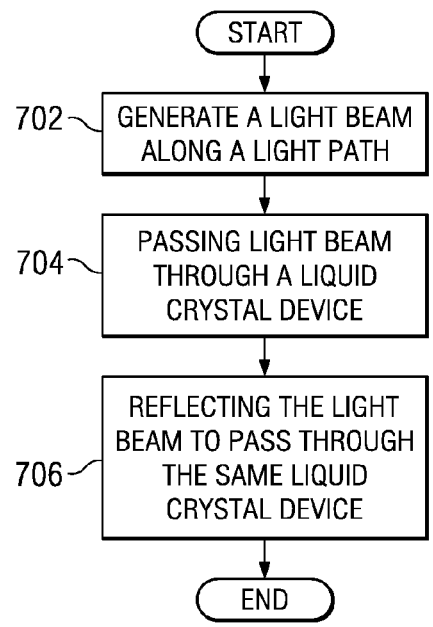
FIG. 7 is a flowchart illustrating a method for non-moving optical beam steering using non-pixelated liquid crystal optical phased array in a reflective device.

FIG. 7 is a flowchart illustrating a method for non-moving optical beam steering using non-pixelated liquid crystal optical phased array in a reflective device. At step 702, a light source generates a light beam along a light path. The light beam may be from any suitable light source including lasers, light bulbs, light emitting diodes, candles, or other suitable light generation devices or materials. The light beam passes through a liquid crystal device in the light path at step 704. The light beam may pass through several layers of the liquid crystal device including a substrate layer, a low impedance layer, liquid crystal layer, a high impedance layer and a quarter-wave plate. The high impedance layer may have two linear electrical contacts that are arranged so that the linear electrical contacts alternate with each other. Different voltages may be applied to each linear electrical contact so that a voltage differential is formed between the contacts. At step 706, the light beam may be reflected by a mirror so that the light beam again passes through the liquid crystal device.

Figure 8:
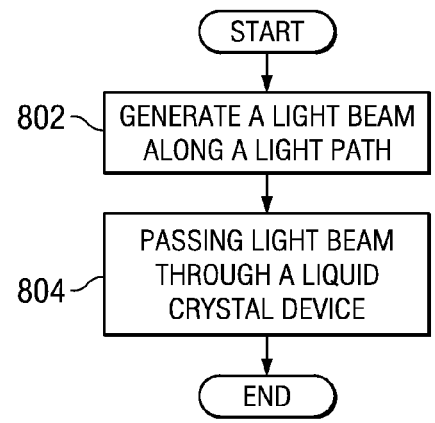
FIG. 8 is a flowchart illustrating a method for non-moving optical beam steering using non-pixelated liquid crystal optical phased array in a transmissive device.

FIG. 8 is a flowchart illustrating a method for non-moving optical beam steering using non-pixelated liquid crystal optical phased array in a transmissive device. At step 802, a light source generates a light beam along a light path. The light beam may be from any suitable light source including lasers, light bulbs, light emitting diodes, candles, or other suitable light generation devices or materials. The light beam passes through a liquid crystal device in the light path at step 804. The light beam may pass through several layers of the liquid crystal device including a substrate layer, a low impedance layer, liquid crystal layer, and a high impedance layer. The high impedance layer may have two linear electrical contacts that are arranged so that the linear electrical contacts alternate with each other. Different voltages may be applied to each linear electrical contact so that a voltage differential is formed between the contacts.

Among other things, the foregoing provides a mechanism for steering an optical beam in one dimension with a liquid crystal device in an array geometry that uses high impedance electrodes along with appropriate voltage addressing. Presence of two linear metallic electrodes on top of a high impedance transparent layer enables the formation of a voltage gradient between the metallic electrodes. The voltage gradient forms a phase gradient across the liquid crystal layer that acts effectively the same as a tiny prism whose prism angle can be controlled through variation in applied voltage amplitude and frequency. An array of such tiny prisms implemented for steering an optical beam in one dimension using only three addressing electrodes can get an extremely large number of addressable spots. The same approach can also be employed to steer a beam in two or three dimensions with a minimum number of electrodes.

Multiple such devices can be fabricated on one cell and can be designed for operation at different wavelengths and polarizations. Multiple devices with 1-D operation can be cascaded to enable operation under unpolarized light. For forming a device with focusing (the third dimension) ability, the phase gradient can be quadratic. Such device(s) can used in scanned/scrolling laser displays with the use of appropriate scanning/scrolling algorithms.

Compared to other approaches, the disclosed approach may be implemented with advantages including: no moving parts; the ability to use only three control electrodes for one-dimensional operation, only five control electrodes for two-dimensional operation, and only seven control electrodes for three-dimensional operation; low drive voltages; lower power consumption compared to rotating polygon and galvanometric approaches; compactness; ability to use either transmissive or reflective geometry; ability to make the arrangement either polarization sensitive or polarization insensitive; easier product addressing compared to other liquid crystal phased arrays; and the ability to address a very large number of far-field spots with minimal number of necessary control electrodes.

Those skilled in the art to which the invention relates will appreciate that modifications may be made to the described examples, and also that many other embodiments are possible, within the scope of the claimed invention.

What is claimed is:

1. A device, comprising:
   a liquid crystal device in a light path, the liquid crystal device comprising:
      a first substrate optically transmissive to light of the light path;
      a second substrate substantially parallel to the first substrate;
      a low impedance layer disposed between the first and second substrates, the low impedance layer having a sheet impedance of at most 10,000 Ohms per square;
      a high impedance layer disposed between the low impedance layer and the second substrate, the high impedance layer having a sheet impedance of at least 200 Ohms per square, and the high impedance layer comprising a plurality of electrode pairs, each electrode pair comprising first and second electrodes;
      a liquid crystal layer disposed between the low impedance layer and the high impedance layer, the liquid crystal layer comprising a plurality of liquid crystal molecules oriented in a substantially similar orientation direction;
      a mirror layer disposed between the high impedance layer and the second substrate;
      a voltage source configured to provide a first voltage to each of the first electrodes, a second voltage to each of the second electrodes, and a reference voltage to the low impedance layer; and
      a quarter-wave plate layer disposed between the high impedance layer and the mirror layer, the quarter-wave plate layer having a slow axis oriented at approximately 45 degrees from the substantially similar orientation direction of the plurality of liquid crystal molecules.

2. The device of claim 1, wherein the liquid crystal layer has a nematic director substantially parallel to a surface plane of the second substrate.

3. The device of claim 1, wherein the liquid crystal layer has a nematic director substantially perpendicular to a surface plane of the second substrate.

4. The device of claim 1, wherein the high impedance layer is substantially transparent to the light of the light path, and the low impedance layer comprises a metallic reflector configured to reflect the light of the light path and connected to receive the reference voltage.

5. The device of claim 1, wherein the first electrodes are arranged in substantially concentric circles, the first electrodes comprising multiple annular voids each optically transmissive to the light of the light path.

6. The device of claim 1, wherein the liquid crystal device is substantially free of mechanically moving parts.

7. A device, comprising:
   a liquid crystal device in a light path, the liquid crystal device comprising:
      a first substrate optically transmissive to light of the light path;
      a second substrate substantially parallel to the first substrate;
      a low impedance layer disposed between the first and second substrates, the low impedance layer having a sheet impedance of at most 10,000 Ohms per square;
      a high impedance layer disposed between the low impedance layer and the second substrate, the high impedance layer having a sheet impedance of at least 200 Ohms per square, and the high impedance layer comprising a plurality of electrode pairs, each electrode pair comprising first and second electrodes;
      a liquid crystal layer disposed between the low impedance layer and the high impedance layer, the liquid crystal layer comprising a plurality of liquid crystal molecules oriented in a substantially similar orientation direction;
      a mirror layer disposed between the high impedance layer and the second substrate; and
      a voltage source configured to provide a first voltage to each of the first electrodes, a second voltage to each of the second electrodes, and a reference voltage to the low impedance layer;
   wherein the first and second electrodes are arranged, within the high impedance layer, in a substantially one-dimensional comb pattern, each first electrode electrically coupled to a respective resistor; and
   wherein, for at least two of the electrode pairs, an opaque layer is disposed within the high impedance layer between the at least two electrode pairs, the opaque layer not optically transmissive to the light of the light path.

8. The device of claim 7, wherein the liquid crystal layer has a nematic director substantially parallel to a surface plane of the second substrate.

9. The device of claim 7, wherein the liquid crystal layer has a nematic director substantially perpendicular to a surface plane of the second substrate.

10. The device of claim 7, wherein the high impedance layer is substantially transparent to the light of the light path; the low impedance layer comprises a metallic reflector configured to reflect the light of the light path and connected to receive the reference voltage.

11. The device of claim 7, wherein the first electrodes are arranged in substantially concentric circles, the first electrodes comprising multiple annular voids each optically transmissive to the light of the light path.

12. The device of claim 7, wherein the liquid crystal device is substantially free of mechanically moving parts.

13. A device, comprising:
a liquid crystal device for steering incident light in a first dimension, the liquid crystal device comprising:
  a first substrate optically transmissive to light of the light path;
  a second substrate substantially parallel to the first substrate;
  a low impedance layer disposed between the first and second substrates;
  a high impedance layer disposed between the first and second substrates, the high impedance layer having a sheet impedance higher than a sheet impedance of the low impedance layer, and the high impedance layer comprising a plurality of electrode pairs, each electrode pair comprising first and second electrodes;
  a liquid crystal layer disposed between the low impedance layer and the high impedance layer, the liquid crystal layer comprising a plurality of liquid crystal molecules oriented in a substantially similar orientation direction; and
  a voltage source configured to provide a first voltage to each of the first electrodes and a second voltage to each of the second electrodes, wherein the first and second voltages generate a voltage gradient between each of the plurality of electrode pairs;
wherein the first and second electrodes are arranged, within the high impedance layer, in a substantially one-dimensional comb pattern, each first electrode electrically coupled to a respective resistor; and
wherein, for at least two of the electrode pairs, an opaque layer is disposed within the high impedance layer between the at least two electrode pairs, the opaque layer not optically transmissive to the light of the light path.

14. The device of claim 13, wherein the liquid crystal device is a first liquid crystal device, and the device further comprises:
  a second liquid crystal device substantially similar in structure to the first liquid crystal device and operable to direct the light in a second dimension substantially perpendicular to the first dimension.

15. The device of claim 13, wherein the liquid crystal device is a first liquid crystal device, and the device further comprises:
  a second liquid crystal device in the light path, the second liquid crystal device substantially similar in structure to the first liquid crystal device; and
  a half-wave plate disposed between the first and second liquid crystal devices, the half-wave plate having a slow axis oriented at approximately 45 degrees from the substantially similar orientation direction of the plurality of liquid crystal molecules.

16. The device of claim 13, wherein the liquid crystal device is a first liquid crystal device, and the device further comprises:
  a second liquid crystal device substantially similar in structure to the first liquid crystal device;
  wherein a plurality of liquid crystal molecules of the second liquid crystal device are each oriented in a direction substantially perpendicular to the substantially similar orientation direction of the plurality of liquid crystal molecules of the liquid crystal layer of the first liquid crystal device.

17. The device of claim 13, wherein the first electrodes are arranged in substantially concentric circles, the first electrodes comprising multiple annular voids each optically transmissive to the light of the light path.

* * * * *